(12) United States Patent
Edling et al.

(10) Patent No.: US 10,334,957 B2
(45) Date of Patent: Jul. 2, 2019

(54) MATTRESS ARRANGEMENT, SUCH AS A BED, HAVING ZONES WITH ADJUSTABLE HEIGHT/FIRMNESS

(71) Applicant: Stjernfjädrar AB, Herrljunga (SE)

(72) Inventors: Kenneth Edling, Herrljunga (SE); Bengt Häger, Vinninga (SE); Nils Eric Stjerna, Herrljunga (SE)

(73) Assignee: STARSPRINGS AB, Herrljunga (SE)

( * ) Notice: Subject to any disclaimer, the term of this patent is extended or adjusted under 35 U.S.C. 154(b) by 198 days.

(21) Appl. No.: 14/655,584

(22) PCT Filed: Jan. 14, 2014

(86) PCT No.: PCT/EP2014/050555
§ 371 (c)(1),
(2) Date: Jun. 25, 2015

(87) PCT Pub. No.: WO2014/117995
PCT Pub. Date: Aug. 7, 2014

(65) Prior Publication Data
US 2015/0320229 A1    Nov. 12, 2015

(30) Foreign Application Priority Data

Feb. 1, 2013  (EP) .................................... 13153654

(51) Int. Cl.
*A47C 23/043*  (2006.01)
*A47C 27/06*  (2006.01)
(Continued)

(52) U.S. Cl.
CPC ........ *A47C 23/0435* (2013.01); *A47C 27/061* (2013.01); *A47C 27/064* (2013.01);
(Continued)

(58) Field of Classification Search
CPC ... A47C 23/00; A47C 23/043; A47C 23/0435; A47C 23/0436; A47C 23/05;
(Continued)

(56) References Cited

U.S. PATENT DOCUMENTS

| 1,465,766 A | * | 8/1923 | Krakauer | ............... A47C 23/05 5/655.8 |
| 1,745,892 A | * | 2/1930 | Edwards | ............... A47C 27/04 5/235 |

(Continued)

FOREIGN PATENT DOCUMENTS

| AU | 551300 B2 | 4/1986 |
| CN | 102413736 A | 4/2012 |

(Continued)

OTHER PUBLICATIONS

International Search Report PCT/ISA/210 for International Application No. PCT/EP2014/050555 dated Feb. 14, 2014.
(Continued)

*Primary Examiner* — Robert G Santos
*Assistant Examiner* — David R Hare
(74) *Attorney, Agent, or Firm* — Harness, Dickey & Pierce, P.L.C.

(57) ABSTRACT

A mattress arrangement, such as a bed arrangement, is disclosed, comprising an upper mattress and optionally an lower mattress. The mattresses are preferably pocket spring mattresses. A support structure is arranged beneath the upper mattress, and comprises at least one flexible elongate element arranged to extend between two holding elements arranged at opposite sides of at least one variable zone in the bed arrangement. A retraction device is further arranged to control the slack of said flexible elongate element(s) by controlling the length of the flexible elongate element(s) being provided between the holding elements. Hereby, the (Continued)

height and/or firmness of the bed arrangement is controlled in the variable zone(s).

17 Claims, 10 Drawing Sheets

(51) Int. Cl.
*B60N 2/70* (2006.01)
*B60N 2/72* (2006.01)
*B60N 2/02* (2006.01)

(52) U.S. Cl.
CPC .......... *B60N 2/7011* (2013.01); *B60N 2/7094* (2013.01); *B60N 2/72* (2013.01); *B60N 2002/026* (2013.01)

(58) Field of Classification Search
CPC ... A47C 23/0522; A47C 23/055; A47C 27/06; A47C 27/061; A47C 27/063; A47C 27/064; A47C 27/07; B60N 2/7011; B60N 2/72; B60N 2/7094; B60N 2002/026

See application file for complete search history.

(56) References Cited

U.S. PATENT DOCUMENTS

| | | | | |
|---|---|---|---|---|
| 2,049,550 A * | 8/1936 | Van Dresser | .......... | A47C 7/345 267/89 |
| 2,236,007 A * | 3/1941 | Oldham | ................. | A47C 27/04 267/93 |
| 2,321,268 A * | 6/1943 | Young | .................. | A47C 27/063 5/260 |
| 2,327,829 A * | 8/1943 | Sternberg | ........... | A47C 23/0435 5/248 |
| 2,874,390 A * | 2/1959 | Stone | .................... | A47C 27/061 5/697 |
| 3,046,574 A * | 7/1962 | Erenberg | ................ | A47C 27/05 5/260 |
| 3,252,170 A * | 5/1966 | Frye | .................... | A47C 23/0433 24/113 R |
| 3,273,877 A * | 9/1966 | Geller | ...................... | B60N 2/72 267/89 |
| 3,287,745 A * | 11/1966 | Maddox | ............. | A47C 23/0435 5/247 |
| 3,340,548 A | 9/1967 | Janapol | | |
| 3,456,271 A * | 7/1969 | Janapol | ................. | A47C 27/06 5/716 |
| 3,608,107 A * | 9/1971 | Kentor | ................. | A47C 27/061 267/89 |
| 3,739,409 A * | 6/1973 | Johnson | ............... | A47C 27/061 5/697 |
| 4,222,137 A * | 9/1980 | Usami | ................ | A47C 23/0435 5/697 |
| 4,234,984 A * | 11/1980 | Stumpf | ................ | A47C 27/063 5/655.8 |
| 4,667,357 A * | 5/1987 | Fortune | ............. | A47C 23/0435 5/697 |
| 4,677,701 A * | 7/1987 | Galumbeck | ........ | A47C 23/0435 5/697 |
| 5,113,539 A * | 5/1992 | Strell | .................... | A47C 23/047 297/284.3 |
| 5,133,539 A | 7/1992 | Lshiguro et al. | | |
| 5,625,914 A * | 5/1997 | Schwab | ............... | A47C 21/006 297/284.1 |
| 5,896,604 A * | 4/1999 | McLean | ............... | A47C 19/027 297/284.1 |
| 5,987,678 A * | 11/1999 | Ayers | ................. | A47C 23/0433 5/655.8 |
| 7,712,172 B2 * | 5/2010 | Jones | ..................... | A61H 7/007 5/694 |
| 2006/0253994 A1 | 11/2006 | Spinks et al. | | |
| 2007/0124865 A1 * | 6/2007 | Stjerna | ................. | A47C 27/063 5/720 |
| 2011/0004371 A1 * | 1/2011 | Bullard | .................. | A47C 7/285 701/36 |
| 2011/0258772 A1 | 10/2011 | Verschuere et al. | | |
| 2012/0042454 A1 * | 2/2012 | Viberg | .............. | A47C 23/0435 5/727 |
| 2015/0313371 A1 * | 11/2015 | Ahlqvist | ............... | A47C 27/064 5/720 |

FOREIGN PATENT DOCUMENTS

| | | |
|---|---|---|
| EP | 2245967 A1 | 11/2010 |
| JP | S57-066711 A | 4/1982 |
| JP | 4-110559 | 9/1992 |
| JP | 2008-113767 A | 5/2008 |
| JP | 2010-252937 A | 11/2010 |
| RU | 2308863 C1 | 10/2007 |
| WO | WO-9965366 A1 | 12/1999 |
| WO | WO-2009120270 A2 | 10/2009 |

OTHER PUBLICATIONS

Russian Office Action for corresponding Russian Patent Application No. 2015128280/12(043859) dated Aug. 31, 2017.
Japanese Office Action dated Dec. 5, 2017 for corresponding Japanese Patent Application No. 2015-555626.

* cited by examiner

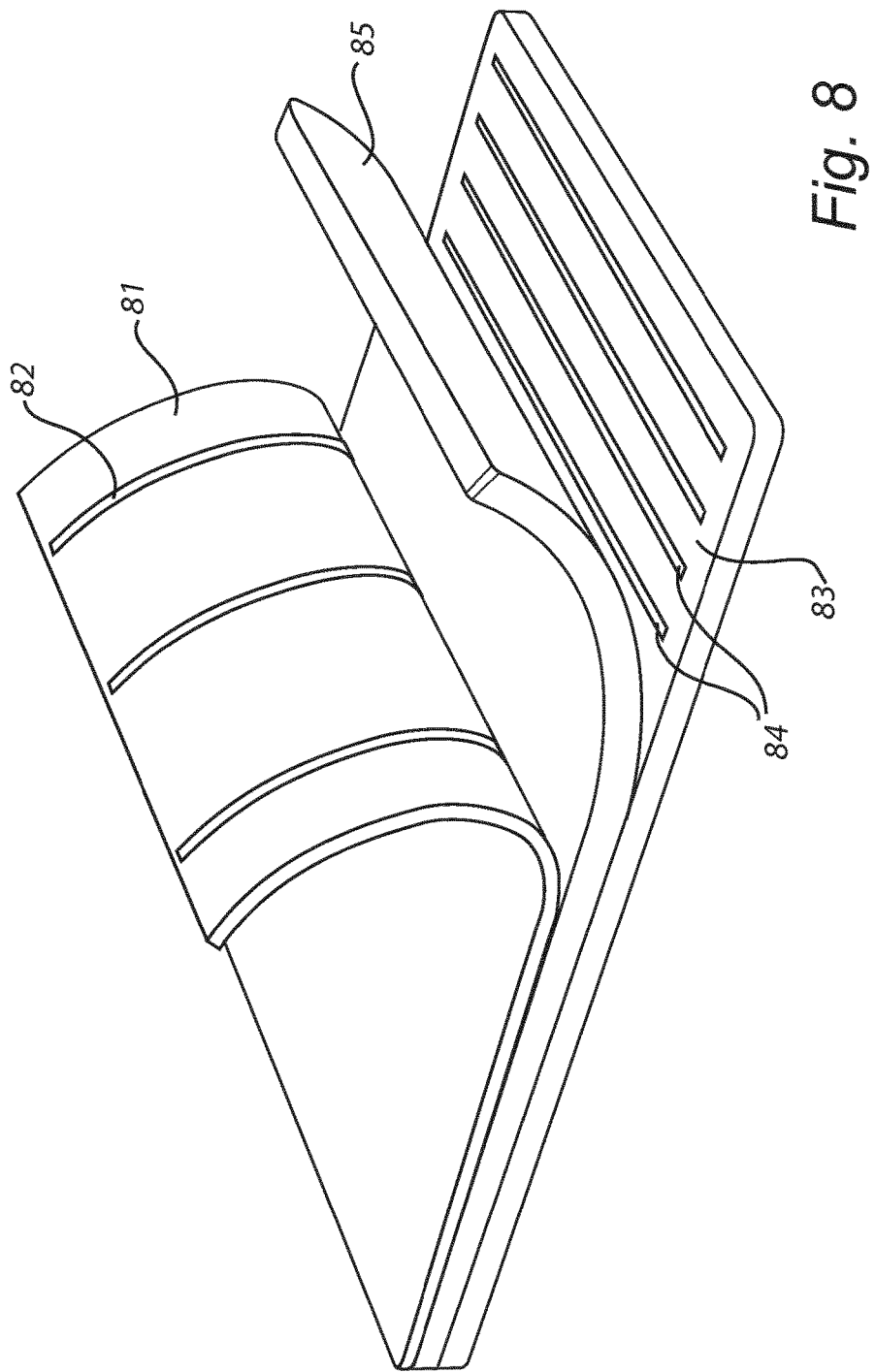

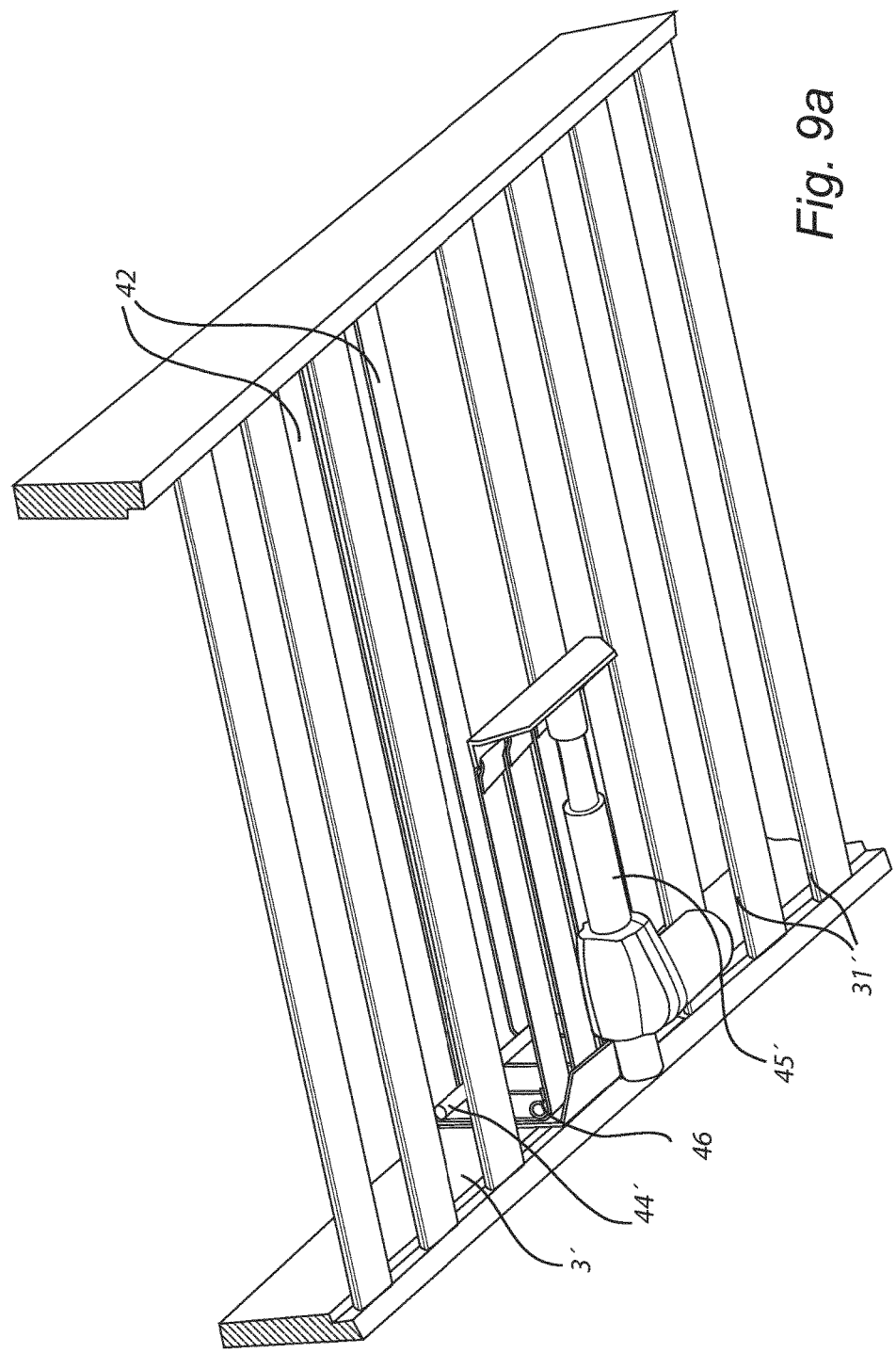

MATTRESS ARRANGEMENT, SUCH AS A BED, HAVING ZONES WITH ADJUSTABLE HEIGHT/FIRMNESS

CROSS-REFERENCE TO RELATED APPLICATIONS

This is a National Phase of PCT/EP2014/050555, filed on Jan. 14, 2014 and claims priority under 35 U.S.C. § 119 to, European Application No. EP 13153654.2 filed Feb. 1, 2013.

FIELD OF THE INVENTION

The present invention relates to a mattress arrangement, such as a bed arrangement, having at least one zone with adjustable height/firmness.

BACKGROUND OF THE INVENTION

In mattress arrangements, such as in a bed arrangement or other seating or furniture arrangements, a support is provided to act on the weight or part of the weight of a user, wherein the bed distributes the weight from the body of the user over a part of a surface of the device. Depending on how the bed distributes the weight of the user, the bed will appear as being either soft or firm. The degree of firmness of such a bed is dependent on the properties of the elastic elements, such as the spring constant, and how the elastic members have been mounted in the bed, such as the degree of clamping or pre-tensioning. Thus, the firmness of the bed is normally set at the manufacturing of the device.

However, different persons wish and require different firmness. Further, different body parts may require different firmness.

It is known to provide bed arrangements with variable firmness. By inducing deformation to the elastic members to different degrees, the firmness of the device is adjustable. The deformation member has the ability to deform the elastic member independently from the deformation of the elastic member induced by the being. This means that the firmness of the bed is adjustable during initialization, according to the wishes of the user. It is also possible to compensate the firmness of the device for possible changes in the elastic properties of the elastic arrangement over time. Still further, it is known to vary the firmness independently in various zones/sections in a mattress.

Such known solutions are e.g. disclosed in EP 2 245 967 and WO 2009/120270. Both these documents also discloses the possibility of sensing the pressure being applied on different zones, and to control the firmness of different zones automatically, in order to lower the overall pressure.

Further, it is known to provide variation in firmness of a mattress by arranging coil springs on support plates having variable height. The height of the support plates may be controlled by rotatable elements arranged under the support plates, and having an off-centre rotation axis. Hereby, by rotation of the rotatable elements, the plates assume various height positions. Such firmness adjustment means are e.g. discussed in U.S. Pat. No. 3,340,548 and US 2011/0258772. It is also known to use a similar arrangement with support plates having variable height where the height of the support plates may be controlled by displacement members in the form of linear motors, jacks, and other types of lifting mechanism. Such firmness adjustment means are e.g. discussed in AU 55 13 00, U.S. Pat. No. 4,222,137, US 2006/0253994, WO 99/65366 and EP 2 245 967.

It is also known to provide zones having variable firmness realized by inflatable elements, in which the pressure is independently variable by means of pressurization means. Such firmness adjustment means are e.g. discussed in WO 2009/120270.

Further, it is known to realize mattresses with variable firmness by a combination of inflatable elements and other resilient elements, such as coil springs, as is e.g. discussed in U.S. Pat. No. 5,113,539.

May other firmness adjustment means are also feasible, such as by arranging threads through the mattress, whereby the height position and/or tension is variable, such as is e.g. discussed in U.S. Pat. No. 4,667,357.

However, common problems with these previously known bed arrangements with variable firmness are that they are relatively complex, heavy and costly to produce. Further, these known bed arrangements are also often relatively difficult and cumbersome to use. Further, even though these known bed arrangements provide a certain degree of adjustability, this is often inadequate for the users' needs.

It is therefore still a need for a mattress arrangement, and in particular a bed arrangement, with adjustable firmness/height which alleviates the above-discussed problems.

SUMMARY OF THE INVENTION

It is therefore an object of the present invention to at least partly overcome these problems, and to provide an improved mattress arrangement.

These, and other objects that will be apparent from the following, are achieved by a mattress arrangement, and a method for controlling such a mattress arrangement, according to the appended claims.

According to a first aspect of the invention there is provided a mattress arrangement, such as a bed arrangement, comprising:

an upper mattress;

a support structure arranged beneath the upper mattress, wherein the support structure comprises at least one flexible elongate element arranged to extend between two holding elements arranged at opposite sides of at least one variable zone, and a retraction device arranged to control the slack of said flexible elongate element(s) by controlling the length of the flexible elongate element(s) being provided between said holding elements, thereby controlling the height and/or firmness of the bed arrangement at said variable zone(s).

The mattress arrangement may be a bed arrangement, but other types of seating or furniture arrangements are also feasible. In particular, the mattress arrangement comprises a mattresses, e.g. in the form of a bed mattress, a cushion or the like, for accommodating the weight of a user. Such mattresses may e.g. be used in seats for all sorts of vehicles, upholstered furniture, bed arrangements and the like.

The support structure may be a separate support structure, such as a bed frame or the like, on which the upper mattress rests. However, the support structure may also be integrated with the upper mattress, such as being a mattress frame forming an integral part with the mattress. In the latter case, the upper mattress and the support structure may also be commonly enclosed in a cover fabric. The support structure may also form a support under the whole upper mattress, or form a support only for a limited part of the upper mattress. Thus, the support structure may have horizontal dimensions corresponding with, or even exceeding, the horizontal dimensions of the upper mattress, or have more limited horizontal dimensions than the upper mattress. In case the support structure has more limited horizontal dimensions than the upper mattress, it is preferred that the support structure has a width dimension corresponding, or even exceeding the width dimension of the upper mattress, but has a length dimension being smaller, or even much smaller, than the length dimension of the upper mattress.

The sleeping/sitting/resting experience, and what is considered comfortable and not, varies greatly from person to person. Further, a user often may find it more comfortable to have a softer mattress when using one lying position, such as on the stomach, i.e. in a prone position, or on the side, than when resting in other sleeping positions, such as on the back, i.e. in supine position. The present invention provides an efficient, yet relatively simple and cost-efficient, way of varying the mattress properties in dependence of the user's wishes, and e.g. based on the choice of lying position. It has been found that this greatly improves the sleeping and resting experience, which provides better resting and sleeping quality. Improved sleep and rest also improves the health of the user, and overall leads to an improved quality of life.

Prior to the present invention, mattresses and seats/beds with adjustable properties were known to be complex, heavy and costly, and also difficult and cumbersome to use. In contrast, the present invention provides a mattress arrangement, such as a bed arrangement, with adjustable properties which weighs very little, is relatively simple and cost-efficient to produce, which is easy to operate for the user, and which is easy to modify, e.g. for using more or fewer adjustable zones. The mattress arrangement also lends itself very well for automated or semi-automated manufacturing.

The term "zone" is here to be construed broadly, indicating the whole or a part of the mattress arrangement. If only one zone is provided, this zone may be provided to extend over the entire mattress arrangement. Alternatively, a variable zone may be provided to extend over only part of the area of the mattress arrangement, whereby one or several non-variable zone(s) are also provided. Further, several variable zones may be provided. In this case, the two or more variable zones may together extend over the entire area of the mattress arrangement. Alternatively, the two or more variable zones may be complemented by one or more non-variable zone(s).

The support structure arranged beneath the upper mattress provides a variable support for the variable zone(s). The support for the/each zone is provided by one or more flexible elongate element, each having a variable slack. When the slack decreases, i.e. when the flexible elongate elements are tightened in, the height and/or firmness of the zone increases, and when the slack increases, i.e. when the flexible elongate elements are loosened, the height and/or firmness decreases.

It has been found that by a low or moderate variation of the slack, considerable variations in firmness properties are obtained. The firmness is also controllable in a very precise and predictable way.

The flexible elongate elements are preferably provided in the form of straps or cords, and preferably of a pliable but non-elastic material.

The mattress arrangement further preferably comprises a lower mattress being arranged beneath said upper mattress, wherein said holding elements are arranged between the lower mattress and the upper mattress. Hereby, the upper mattress is supported by the lower mattress. When the slack of the flexible elongate element(s) increases, this allows the upper mattress to sink into the lower mattress, thereby increasing the softness of the bed/seat. When the slack is reduced, this prohibits the upper mattress to sink into the lower mattress, resulting in a firmer zone. In addition to providing an overall increased comfort, the use of both an upper and lower mattress in this way also ensures that the upper surface of the mattress arrangement will always be planar, regardless of whether the flexible elongate element(s) are tightened or not. If no lower mattress is used, there is a risk that the upper surface will have lowered areas at the zone(s) when the slack of the flexible elongate element(s) is increased, but when using a lower mattress in this way, no such risk is present. The lower mattress is preferably softer, at least in a part underlying said variable zone(s), than said upper mattress, which pronounces the above-discussed effect.

The mattress arrangement may further comprise a frame in which said lower mattress is arranged, and wherein the holding elements are connected to said frame. The frame can e.g. be made of wood, plastic or metal. The frame is preferably arranged to at least partly surround the lower mattress. Optionally, the frame may also extend to at least partly surround the upper mattress.

One of said holding elements is preferably a fixed holding element, fixedly holding one end of the flexible elongate element(s), and the oppositely arranged holding element is preferably a displacement holding device, enabling holding of the flexible elongate element(s) in various displaced positions. The displacement holding device may e.g. be realized as a sliding surface or a roll, defining a path between the retraction device and the fixed holding element.

The retraction device may be arranged beneath a plane in which the holding elements are positioned. For example, the retraction device may be arranged at the lower surface of the mattress arrangement, beneath the lower mattress. However, alternatively the retraction device may be arranged essentially in the plane in which the holding elements are positioned. In such an embodiment, the retraction device is arranged between the upper and lower mattresses.

The retraction device may preferably be arranged to retract the flexible elongate element(s) by at least one of rolling up the element(s) around an axle, pulling the element(s) and pushing the element(s). The retraction device is preferably operated by means of at least one of an electric motor and an electric pump.

However, the retraction device may also be operated manually. For example, a lead screw or translation screw may be used. A knob, wheel or any other type of handle may then be manually rotated, thereby rotating the screw, resulting in a corresponding displacement of the connection of the flexible elongate elements. Other type of manually operable retraction devices are also feasible, such as by providing longitudinally separate holes in the flexible elongate elements, which are releasably connected to holding pins or the like in various displaced positions.

The flexible elongate element(s), such as strap(s) or cord(s), is/are preferably formed of a non-elastic material. Hereby, the controllability of the height/firmness is improved. However, elastic or somewhat elastic flexible elongate elements may also be used.

Only one flexible elongate element may be arranged to extend underneath each of said variable zone(s). In this case, the flexible elongate element is preferably relatively wide, preferably extending over a substantial part of the width of the variable zone, such as extending over more than 50% of the width of the variable zone, and even more preferred extending over more than 70%. However, preferably at least two parallel flexible elongate elements are arranged to extend underneath each of said variable zone(s). More than two parallel flexible elongate elements may also be used. If the mattress comprises rows of resilient elements, such as coil springs, it is preferred that the number of flexible elongate elements underneath each variable zone corresponds to the number of rows of resilient elements of the zones.

One or several flexible elongate element(s) may also be integrated in a common piece of material having greater dimensions. For example, one or several flexible elongate element(s) may be formed in a piece of woven or non-woven fabric or the like. This fabric may extend over essentially the whole variable zone(s), or even the whole mattress. The integrally formed flexible elongate element(s) may here be provided by arranging the two holding elements at opposite sides of only a limited part of the fabric, e.g. corresponding to at least one variable zone, to control the slack of said integrally formed flexible elongate element(s) by controlling the length of the flexible elongate element(s) being provided between said holding elements, thereby controlling the height and/or firmness of the bed arrangement at said variable zone(s). In this case, the rest of the fabric will be affected only to a very limited extent, or not at all.

The mattress arrangement preferably comprises at least two zones, of which at least one constitutes a variable zone.

Further, the mattress arrangement preferably has at least two variable zones, and the support structure preferably comprises at least one flexible elongate element for each of said variable zone, arranged to extend between two holding elements arranged at opposite sides of said variable zones, and wherein the retraction device is arranged to control the slack of said flexible elongate element(s) for each of said zones independently. Hereby, two or more zones with independently variable height/firmness is provided in the mattress arrangement. More than two variable zones may also be provided, such as three, five or seven. For example, different zones with variable firmness may be provided at least for the user's hip part and shoulder part. Such zones may be provided also for the user's feet part and head part. In between these zones, zones being provided with a constant firmness may be provided. However, alternatively also these zones may have a variable firmness. Thus, in more refined embodiments, 7, 10 or even more zones with variable firmness may be provided.

Preferably, the mattress arrangement, and preferably a bed arrangement, further comprises at least one sensor, said sensor(s) being adapted to measure a physical parameter which is proportional to a weight acting on the mattress by the user or a lying position used by the user; and a control unit arranged to determine, based on input from said sensor(s), the present weight/lying position of the user, and to control the retraction device to adjust the slack of the flexible elongate element(s) to preset values corresponding to the determined weight or lying position. Hereby, the bed arrangement may automatically adjust to preferences of different users, different lying positions, etc.

The sensors are preferably arranged as an array of sensors being arranged over the mattress surface. For example, the sensors may be arranged in a preferably flexible and planar sensor envelope arranged on top of the mattress. The sensor envelope may have an electrical impedance characteristic that varies with a normal force exerted thereon. In particular, the sensor envelope may include an upper flexible electrically conductive sheet comprising an upper sensor conductor, a lower flexible electrically conductive sheet comprising a lower sensor conductor, and a flexible intermediate layer, such as a piezoresistive layer, having an active sensor region which has an electrical impedance characteristic that varies with a normal force exerted thereon, said intermediate layer being located between said upper and lower conductive sheets. The upper and lower sheets are here conductively coupled to the intermediate layer. The sensors may preferably have a non-bilateral current-versus-voltage impedance characteristics. The piezoresistive layer is e.g. realizable as electrically conductive particles suspended in a polymer matrix. The electrically conductive particles may e.g. be provided with a coating including at least one metallic oxide, such as copper oxide, to thereby form with said layer a semi-conducting PN-junction. The envelope is preferably made, at least partially, of an elastically stretchable material, and preferably by stretchable fabric. Examples of such sensor envelopes that may be used in the above-discussed mattress/bed arrangement are the ones disclosed in U.S. Pat. No. 8,161,826 and WO 2009/120270, both said documents hereby being incorporated by reference.

The firmness of the variable zones may also be controlled manually. For communication with the control unit, a remote control may be used, which is adapted to communicate with the control unit, e.g. through a wireless interface.

One or several sensor(s) may also be provided to determine the position/state of the flexible elongate element(s) and/or the retraction device, thereby enabling determination of the current level of slack in the flexible elongate elements. For example, a pulse transducer or pulse generator may be provided in the retraction device to this end. Information from such sensor(s) may be used to provide information of the current slack level to the user, e.g. to be presented in a display on a remote control for the mattress/bed arrangement. The sensor(s) may also be to enable automatic resumption of one or several previously stored positions, such as predetermined or pre-stored slack levels, to resume a predetermined default position or the like.

As discussed above, the support structure may have horizontal dimensions corresponding to, or even exceeding, the horizontal dimensions of the upper mattress. However, the support structure may also have more limited horizontal dimensions, e.g. corresponding to only the horizontal dimensions of the variable zone(s).

The variable zone(s) preferably extend(s) over essentially the whole width of the upper mattress. In case several zones are provided, the zones are preferably separated in a longitudinal direction of the mattress. Since the same firmness is usually requested, regardless of the whether the user lies in the centre, or towards one of the sides, there is usually no need to separate the zones in the width direction. However, in case the mattress/bed arrangement is to be used by more than one person simultaneously, or if there is a need to distinguish between different lateral positions for other reasons, zones having variable firmness being separated also in the width direction may be used. In this case, it is e.g. feasible to use two separate, and independently operable support structures, and e.g. a common upper mattress arranged above these two support structures.

The upper mattress may be of various types, such as having inflatable elements, comprising resilient foam elements, resilient rubber, and the like. However, preferably the upper mattress comprises a plurality of coil springs, and preferably coil springs individually arranged in separate pockets of a cover material, to define a pocket spring mattress. The lower mattress may be of the same type as the upper mattress, or of a different type.

When the upper mattress is a pocket spring mattress, each variable zone is preferably formed of a mattress part which is freely displaceable in relation to other parts of the mattress. This may e.g. be obtained by forming zones of strings of pocket elements together by surface connections, such as by means of adhesive, and not provide such connections between the strings between adjacent zones.

When the upper mattress is a pocket spring mattress, the flexible elongate elements are preferably provided in the form of cords, which preferably extend between adjacent rows of pocketed springs.

According to another aspect of the invention, there is provided a method for adaptation of the properties of a mattress arrangement, comprising the steps:
providing an upper mattress;
providing at least one supporting flexible elongate element underneath said upper mattress; and
controlling the slack of said flexible elongate element(s), thereby controlling the height and/or firmness of the mattress arrangement in at least one variable zone.

By means of these additional aspects of the invention, similar objects and advantages as discussed above in relation to the first aspect of the invention are obtainable.

BRIEF DESCRIPTION OF THE DRAWINGS

These and other aspects of the present invention will now be described in more detail, with reference to the appended drawings showing currently preferred embodiments of the invention.

FIG. 8 shows a more detailed view of one embodiment of sensor arrangement;

FIGS. 9a-9b show different perspective views, from above and beneath, of a firmness/height adjustment arrangement according to one embodiment of the present invention;

DETAILED DESCRIPTION

In the following, the invention will be exemplified by means of bed arrangements. However it is to be acknowledged by the skilled reader that the same principles and functions may also be used in other types of mattress arrangements using mattresses, e.g. in the form of a bed mattress, a cushion or the like, such as seats for all sorts of vehicles, upholstered furniture, and the like. Accordingly, when reference in the following is made to a bed or bed arrangement, it is to be understood that this may also be used in other types of mattress arrangements, and in particular other types of furniture arrangements.

Figure 1:
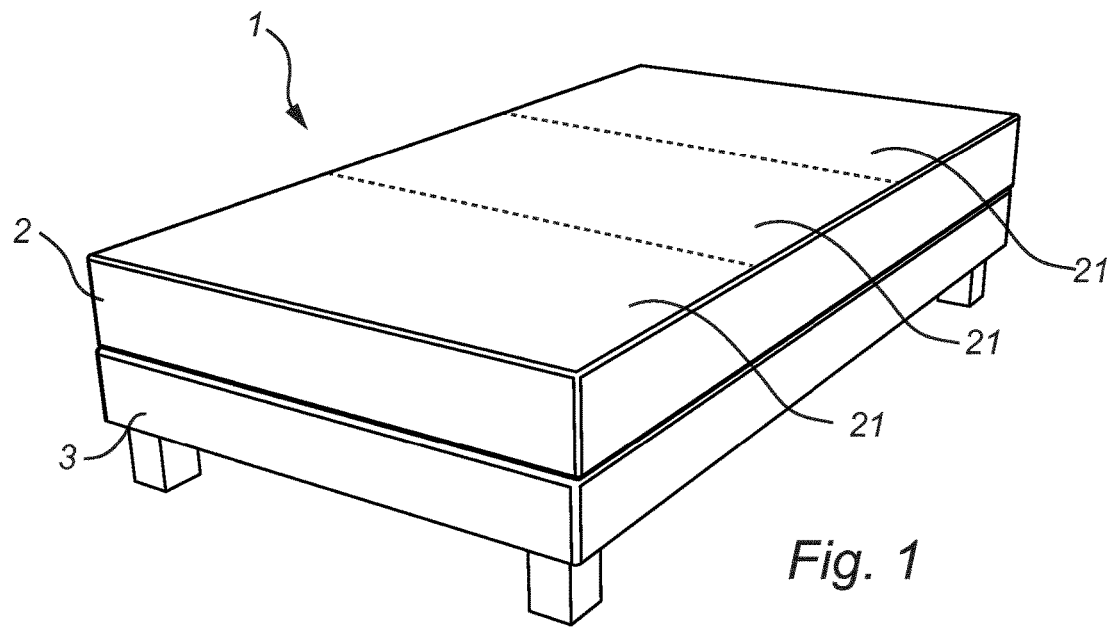
FIG. 1 shows a schematic perspective view of an embodiment of a bed arrangement according to the present invention.

A bed arrangement according to a first embodiment of the invention is shown schematically in FIG. 1. The bed arrangement has an adaptive height/firmness, and more specifically comprises at least one zone having independently adjustable firmness. The bed arrangement may comprise a single zone, or two or more zones. Further, in case several zones are used, one or more zones may be variable. Further, one or more zones which are non-variable may also be used.

The bed arrangement 1 in FIG. 1 is of so-called continental type, and comprises an upper mattress 2. The bed arrangement in this exemplary embodiment comprises three zones 21, of which the zone in the middle is variable, and the other zones are non-variable. The upper mattress rests on a lower mattress 3, which also forms the base of the bed arrangement.

Figure 2:
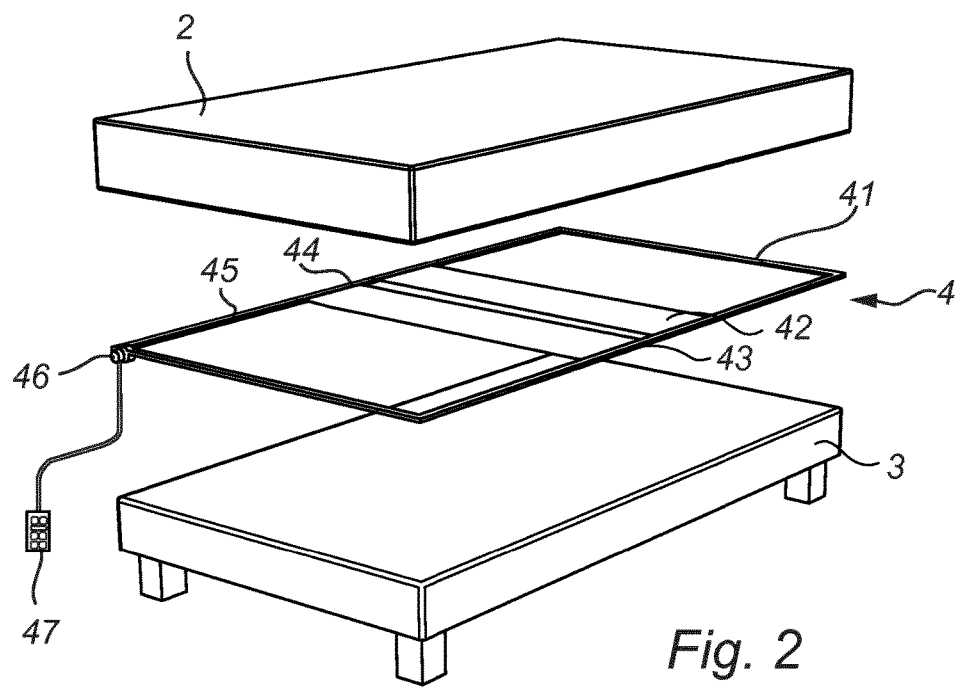
FIG. 2 shows a schematic exploded perspective view of the bed arrangement of FIG. 1.

The adjustability of the variable zone(s) may, as illustrated in FIG. 2, be provided by means of a support structure 4 arranged beneath the upper mattress 2. The support structure comprises a frame 41, and at least one flexible elongate element, here in the form of a strap 42, arranged to extend between two holding elements 43, 44 arranged at opposite sides of the frame and the variable zone(s). One of the holding elements 43 is a fixed connection, fixedly connecting the strap(s) to the frame. The other holding element is here a moveable fixation element 44. The moveable fixation element 44 is here a rotatable axle, forming a retraction device 45 arranged to control the slack of the strap(s) by controlling the length of the strap being provided between the holding elements. Hereby, the height and/or firmness of the overlying upper mattress, and consequently the bed arrangement at the variable zone(s), are controlled.

Rotation of the rotatable axle 45 may be controlled by an electric motor 46 or other drive unit, whereby rolling in of the straps decreases the slack and increases the height/firmness, whereas rolling out increases the slack and decreases the height/firmness. The retraction device may e.g. be controlled by means of a remote control 47, which may be connected by wireless or wired connection to the drive unit.

As will be discussed more thoroughly in the following, the flexible elongate element(s) may also be of other types, such as in the form of cords or the like. Thus, whenever reference is made to a strap, it may likewise be a cord or any other suitable flexible elongate element, and vice versa.

Figure 3:
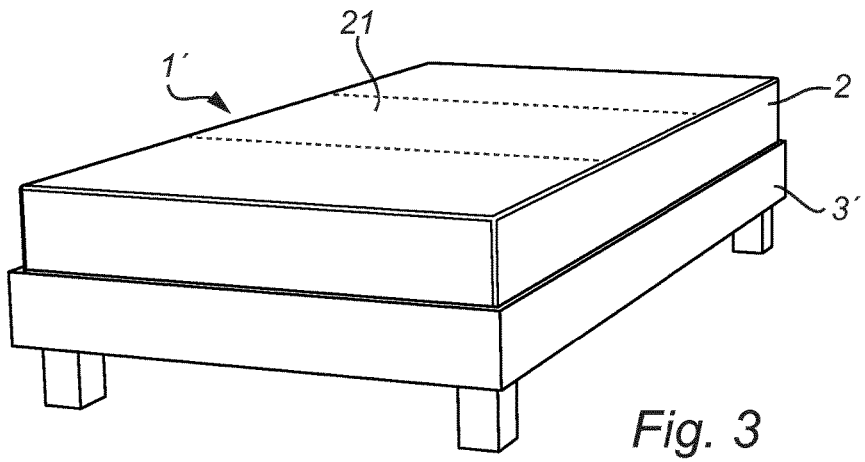
FIG. 3 shows a schematic perspective view of another embodiment of a bed arrangement according to the present invention.
Figure 4:
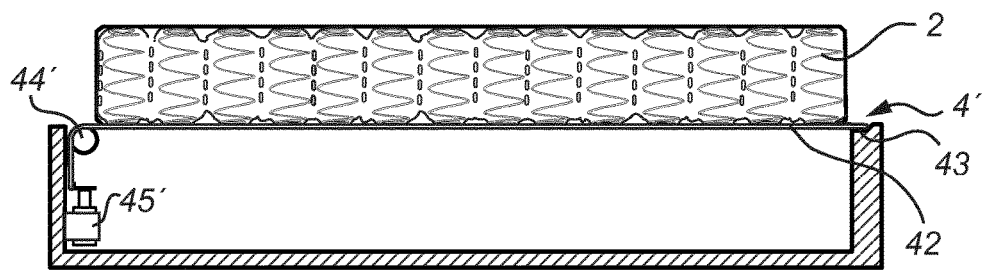
FIG. 4 shows a schematic cross-sectional view of the bed arrangement of FIG. 3, in accordance with a first embodiment.
Figure 5:
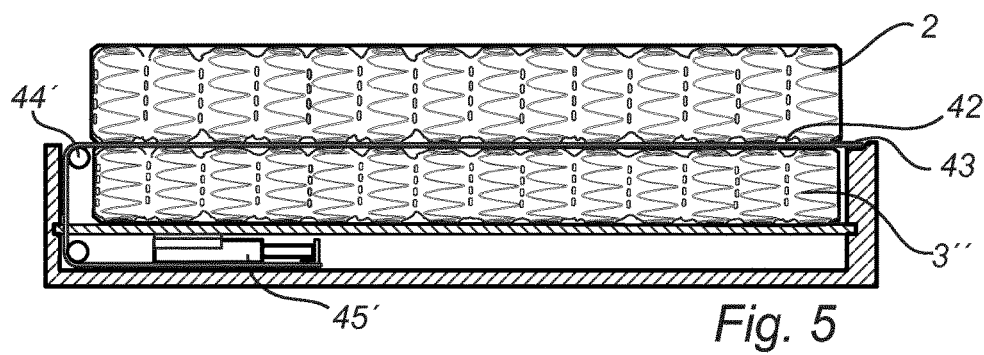
FIG. 5 shows a schematic cross-sectional view of the bed arrangement of FIG. 3, in accordance with a second embodiment.

In an alternative embodiment, illustrated in FIGS. 3-5, the bed arrangement 1' is of so-called Nordic type, and comprises an upper mattress 2, having at least one, zone 21. The upper mattress rests on a framed base 3'. The frame may be empty, as shown in FIG. 4, or provided with a lower mattress 3", as shown in FIG. 5.

Also in this embodiment, at least one of the zones 21 is a variable zone. The adjustability of the variable zones may, as illustrated in FIGS. 4 and 5, be provided by means of a support structure 4' arranged beneath the upper mattress 2. The support structure is connected to the frame 3', and comprises at least one strap 42 arranged to extend between two holding elements 43, 44' arranged at opposite sides of the frame and the variable zone(s). One of the holding elements 43 is a fixed connection, fixedly connecting the strap(s) to the frame. The other holding element is here a moveable fixation element 44'. The moveable fixation element 44' is here a sliding fixation element, such as a sliding surface, or a rotatable fixation element, such as a roller. A retraction device 45' is arranged to control the slack of the strap(s) by controlling the length of the strap being provided between the holding elements. Hereby, the height and/or firmness of the bed arrangement at the variable zone(s), are controlled.

The retraction device 45' may here be provided as a piston arrangement, arranged to pull or push the strap(s). The retraction device 45' may be arranged at the side of the frame, as seen in the exemplary embodiment of FIG. 4, or at the bottom of the bed arrangement, as seen in the exemplary embodiment of FIG. 5.

Figure 9B:
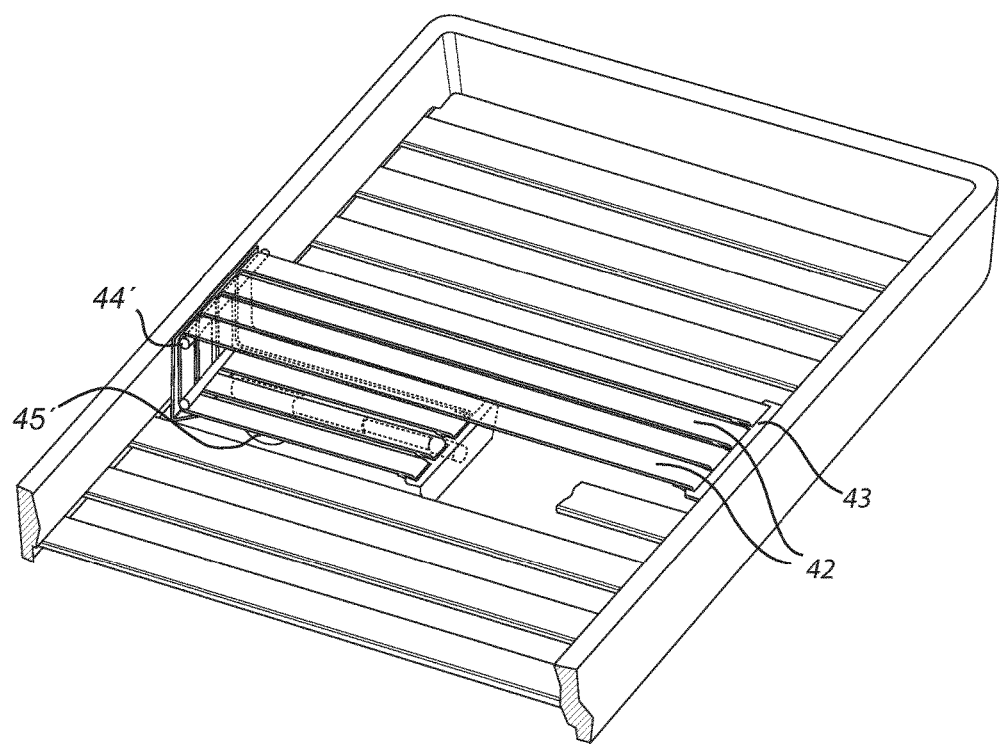

One embodiment of the support structure and retraction device is illustrated in more detail in FIGS. 9a-9b. The support structure is arranged on a frame 3'. The frame may be provided with base forming ribs 31', on which an optional lower mattress may be arranged. A retraction device 45' is here arranged at the bottom of the frame. At least one strap 42, or other type of flexible elongate element, is arranged to extend between two holding elements 43, 44' arranged at opposite sides of the frame and the variable zone(s). The holding element 43 is a fixed connection, fixedly connecting the strap(s) to the frame. This may e.g. be arranged as a bolted connection. The other holding element is here a displacement fixation element 44', here realized as a sliding fixation element. A further fixation element 46, here also realized as a sliding fixation element, is provided at the lower end of the frame. The retraction device 45' is here arranged as a piston, pushing the end(s) of the strap(s) 42 away to decrease the slack.

Figure 10:
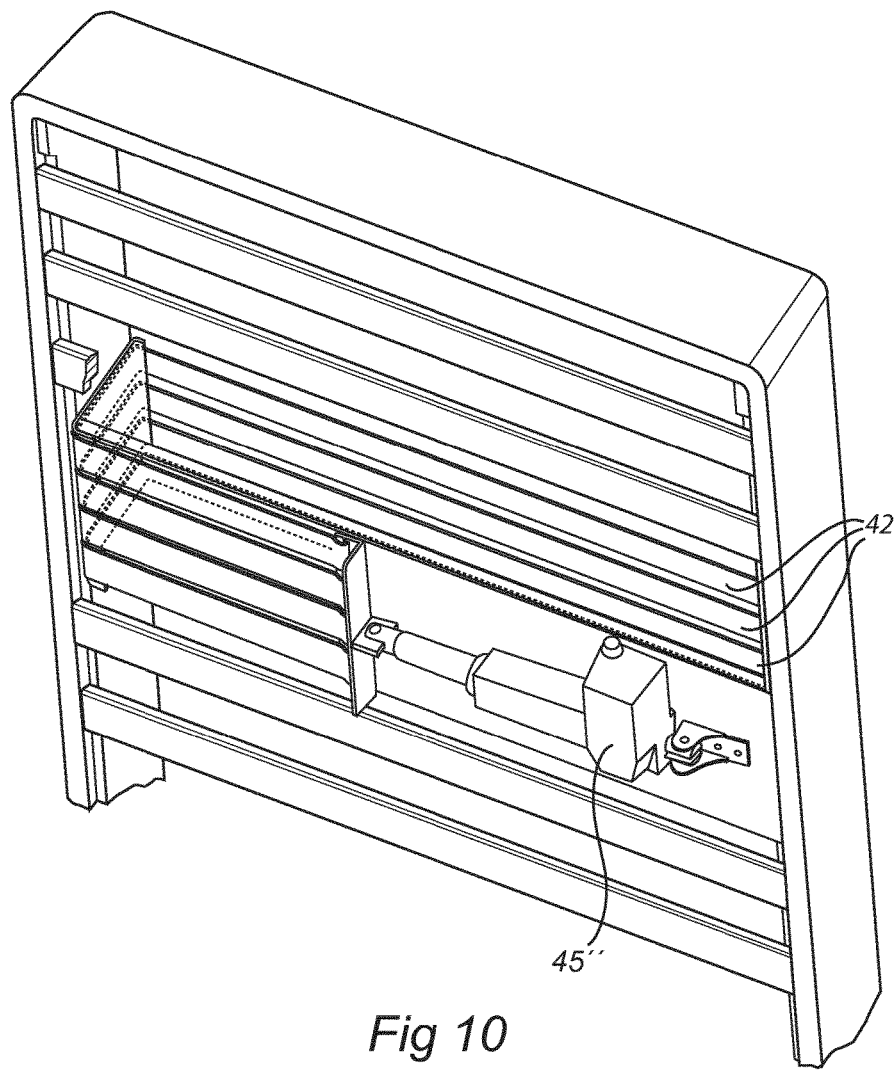
FIG. 10 shows a perspective view from beneath of a firmness/height adjustment arrangement according to another embodiment of the present invention.

In an alternative embodiment, shown in FIG. 10, a similar support structure is provided. However, here the retraction device 45" is instead arranged as a piston pulling the end(s) of the straps(s) 42 to decrease the slack. The firmness/height of the variable zone(s) may be controlled manually, e.g. by means of a remote control. However, alternatively the variable zone(s) may be controlled automatically, e.g. to adjust to certain weight distributions, lying positions or the like. Such embodiments are shown schematically in FIGS. 7a-7c. Here, a sensor arrangement 5 may be provided, preferably having at least one sensor 51 arranged on each of the zones. The sensors are preferably adapted to measure a physical parameter which is proportional to a weight acting on the mattress by the user in measurement areas of the sensors. The sensors may be connected to the drive unit to adjust the firmness/height of the zones. A control unit 6 may be arranged to receive input from the sensors, and determine, based on this input, the present lying position of a user, the weight distribution of the user, the deformation of the mattress, or the like. Preferably, the control unit 6 is arranged to control the drive unit(s) to adjust the firmness of the zones to preset firmness values corresponding to the determined lying position.

The bed arrangement may comprise a single zone having variable firmness, or a single zone having variable firmness, combined with one or more zones having a non-variable firmness. However, preferably the bed arrangement comprises at least two zones having independently adjustable firmness. It may also comprise at least three such zones, and even at least five zones. For example, different zones with variable firmness may be provided at least for the user's buttock and shoulder. Such zones may be provided also for the user's feet and head. In between these zones, zones being provided with a constant firmness may be provided. However, alternatively also these zones may have a variable firmness. Thus, in more refined embodiments, 7, 10 or even more zones with variable firmness may be provided.

Figure 6A:
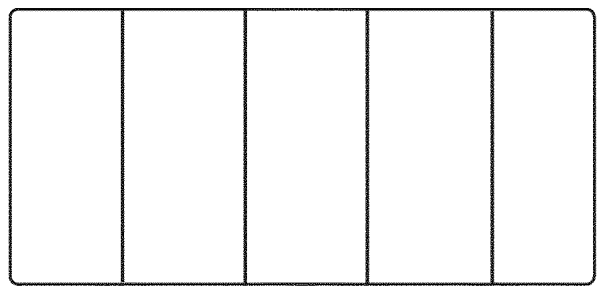
FIGS. 6a-6d show schematic top views of various possible zone configurations useable in bed arrangements in accordance with the present invention.

In FIG. 6a, an exemplary embodiment having five zones with variable firmness is illustrated. The zones may in this case correspond to head/neck, shoulders, pelvis, legs and feet (from one side to the other).

Figure 6B:
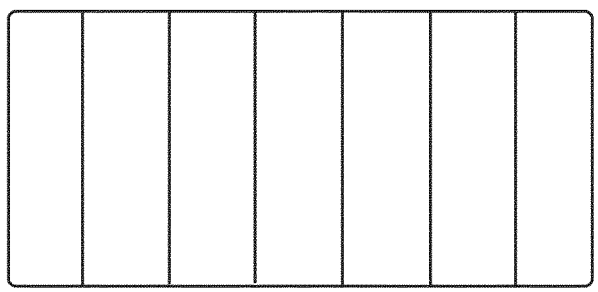

In FIG. 6b, an exemplary embodiment having seven zones with variable firmness is illustrated. The zones may in this case correspond to head/neck, shoulder/upper back, lumbar, buttock/pelvis, thigh/knee, calf/lower leg and foot/ankle (from one side to the other).

Figure 6C:
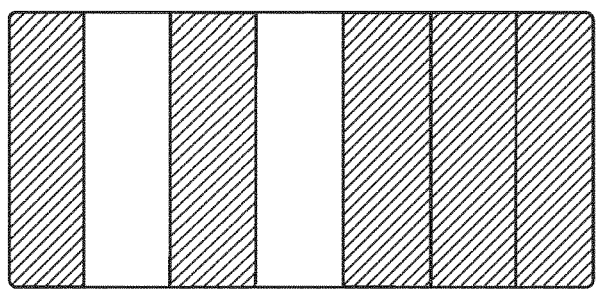

In FIG. 6c, the same zones as in FIG. 6b are provided, but here, only the shoulder/upper back zone and the buttock/pelvis zone have adjustable firmness, whereas the other zones are provided with a fixed, non-variable firmness. The thigh/knee, calf/lower leg and foot/ankle zones may in this case be provided as three separate zones, as two zones or as one single zone.

However, the above-discussed zone configurations are only provided as examples, and other zone configurations, involve more or fewer zones are also feasible.

Figure 6D:
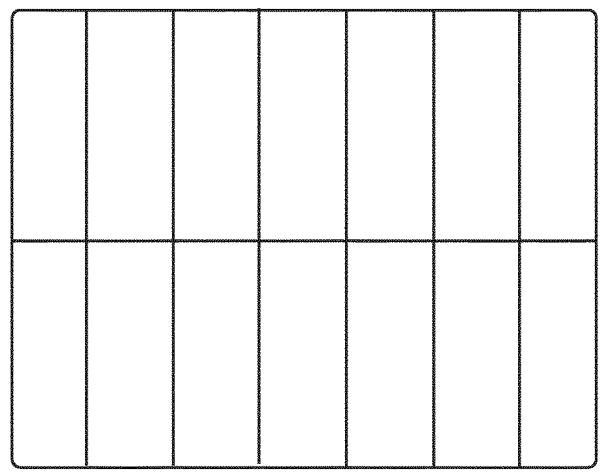

Preferably, the zones having independently adjustable firmness extends over essentially the whole width of the mattress and being separated in a longitudinal direction of the mattress. Such embodiments are illustrated in FIGS. 6a, 6b and 6c. However, in case the bed arrangement is to be used by more than one person simultaneously, or if there is a need to distinguish between different lateral positions for other reasons, zones having variable firmness being separated also in the width direction may be used. An example of such a zone configuration is illustrated in FIG. 6d. Here, seven zones in the longitudinal direction are provided, as in FIG. 6b, but in addition each longitudinal zone is also separated into two zones in the width direction. Thus, in total this embodiment comprises 14 zones having independently controllable firmness. Again, the above-discussed zone configuration is only provided as an example, and a separation in two zones in the width direction is equally feasible, as well as more than three, such as four, five or even more. Such a configuration may e.g. be used for a double bed, intended for two persons. In such a configuration, separate support structures may be provided, which are independently controllable. The upper mattress may be two separate mattresses, or one single mattress extending over both support structures.

Figure 7A:
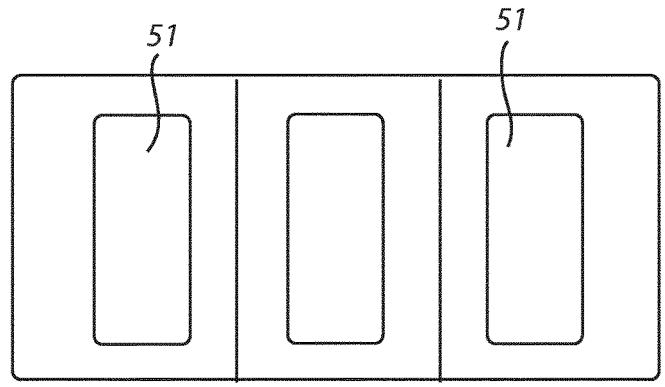
FIGS. 7a-7c show schematic top views of different embodiments of sensor arrangements on the mattress in bed arrangements in accordance with the present invention.
Figure 7B:
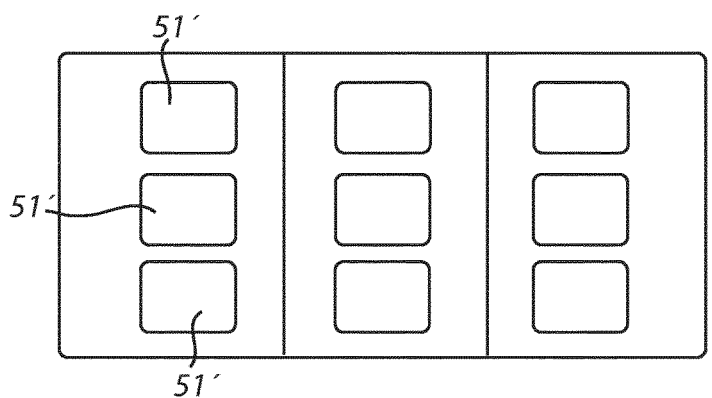
Figure 7C:
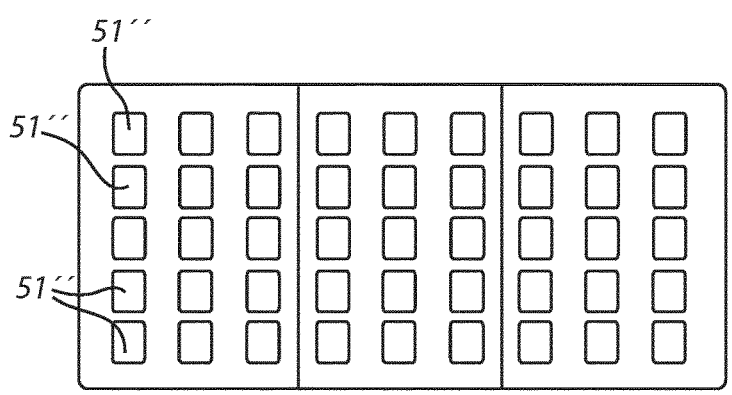

The sensors are preferably arranged on top of the mattress. Various configuration arrangements are feasible, depending on which type of sensors that are used, and how fine resolution that is required. In FIGS. 7a-7c, some alternative configurations are schematically illustrated.

In FIG. 7a, a sensor arrangement providing one sensor area 51 in each zone is illustrated. Hereby, the pressure being applied on each zone is determinable. In FIG. 7b, a sensor arrangement providing three sensor areas 51' in each zone is illustrated, the sensor areas being separated in a width direction of the mattress. Hereby, the pressure being applied on each zone is determinable, but in addition, it is possible to determine how the pressure on each zone is distributed between the centre and the sides. In FIG. 7c the sensor arrangement comprises an array of sensors areas 51" within each zone, the sensors within each zone being separated both in the length and width direction of the mattress. In the exemplary embodiment of FIG. 7c, 5 sensor areas are provided in the length direction, and three sensor areas in the width direction in each zone, providing a total of 15 sensor areas within each zone. However, more or fewer sensor areas may be used, and the sensor areas may also be arranged in different patterns. The number of sensor areas also need not be the same in all the different zones.

The sensors may be adapted to measure a physical parameter proportional to a weight acting on the mattress by the user and transfer measured information regarding the physical parameter to the control unit. The physical parameter may e.g. be pressure, weight, deformation, temperature, etc. Thus, by means of the sensor, the weight subjected to the bedding arrangement is measurable. The measured information is used as a basis for adjusting the firmness of the zones, as will be discussed in more detail in the following.

Many different gauges may be used for realization of the sensors. For example, one or several of manometers, piezoelectric strain gauges, capacitive gauges, magnetic gauges, piezoelectric gauges, optical gauges, potentiometric gauges and resonant gauges, thermocouple gauges and thermistor gauges may be used. The sensors may be arranged within the mattress, below the mattress or on top of the mattress.

In an exemplary embodiment, the sensors are realized as an array of sensors being arranged over the mattress surface. For example, the sensors may be arranged in a preferably flexible and planar sensor envelope arranged on top of the mattress. The sensor envelope may have an electrical impedance characteristic that varies with a normal force exerted thereon. Such an sensor arrangement is shown schematically in FIG. 8. Here, the sensor envelope includes an upper flexible electrically conductive sheet 81 comprising upper sensor conductor(s) 82, a lower flexible electrically conductive sheet 83 comprising lower sensor conductor(s) 84, and a flexible intermediate layer 85, such as a piezoresistive layer, having an active sensor region which has an electrical impedance characteristic that varies with a normal force exerted thereon. The intermediate layer 85 is located between the upper conductive sheet 81 and the lower conductive sheet 83. The upper and lower sheets 81, 83 are here conductively coupled to the intermediate layer. The sensors may preferably have a non-bilateral current-versus-voltage impedance characteristics. The piezoresistive layer is e.g. realizable as electrically conductive particles suspended in a polymer matrix. The electrically conductive particles may e.g. be provided with a coating including at least one metallic oxide, such as copper oxide, to thereby form with said layer a semi-conducting PN-junction. The envelope is preferably made, at least partially, of an elastically stretchable material, and preferably by stretchable fabric. Examples of such sensor envelopes that may be used in the above-discussed bed arrangement are the ones disclosed in U.S. Pat. No. 8,161,826 and WO 2009/120270, both said documents hereby being incorporated by reference.

The control unit may be arranged to determine, based on input from said sensors, the present lying position of a user continuously or regularly. For example, the control unit may continuously monitor the sensor data, and evaluate whether a change in lying position has occurred, or do such evaluation regularly, such as every 15 or 30 seconds, every minute, or the like. However, alternatively or additionally, the control unit may be adapted to determine, based on input from said sensors, the present lying position of a user when it is determined that a sensor input from any of the sensors is changed compared to a last stored sensor value from said sensor by a magnitude exceeding a predefined threshold value.

The mattress may be of various types, such as having inflatable elements, comprising resilient foam elements, resilient rubber, and the like. However, preferably the mattress comprises a plurality of coil springs, and preferably coil springs arranged in separate pockets of a cover material, to define a pocket spring mattress.

In a pocket mattress realization of the present mattress, each zone is preferably arranged as a separate pocket mattress, assembled together. However, a continuous pocket mattress extending over several, or all, of the zones is also feasible. Each pocket mattress preferably comprises a plurality of strings interconnected side by side by means of a surface attachment, such as adhesive, welding, Velcro or the like. Each string comprises a plurality of continuous casings/pockets, formed by a continuous material and separated from each other by means of transverse seams, such as welded seams. Each casing/pocket contains at least one, and preferably only one, helical coil spring. The springs may have a spiral turn with a diameter of approximately 2 to 10 cm, and preferably 6 cm.

However, as discussed above, other types of mattresses are also possible to use in the above-discussed bed arrangement.

The flexible elongate elements may be arranged as straps, as discussed in the previous exemplary embodiments. However, the flexible elongate elements may also be provided in the form of cords, such as wires, strings, lines, ropes or the like formed by e.g. metal, plastic and/or textile.

Figure 11:
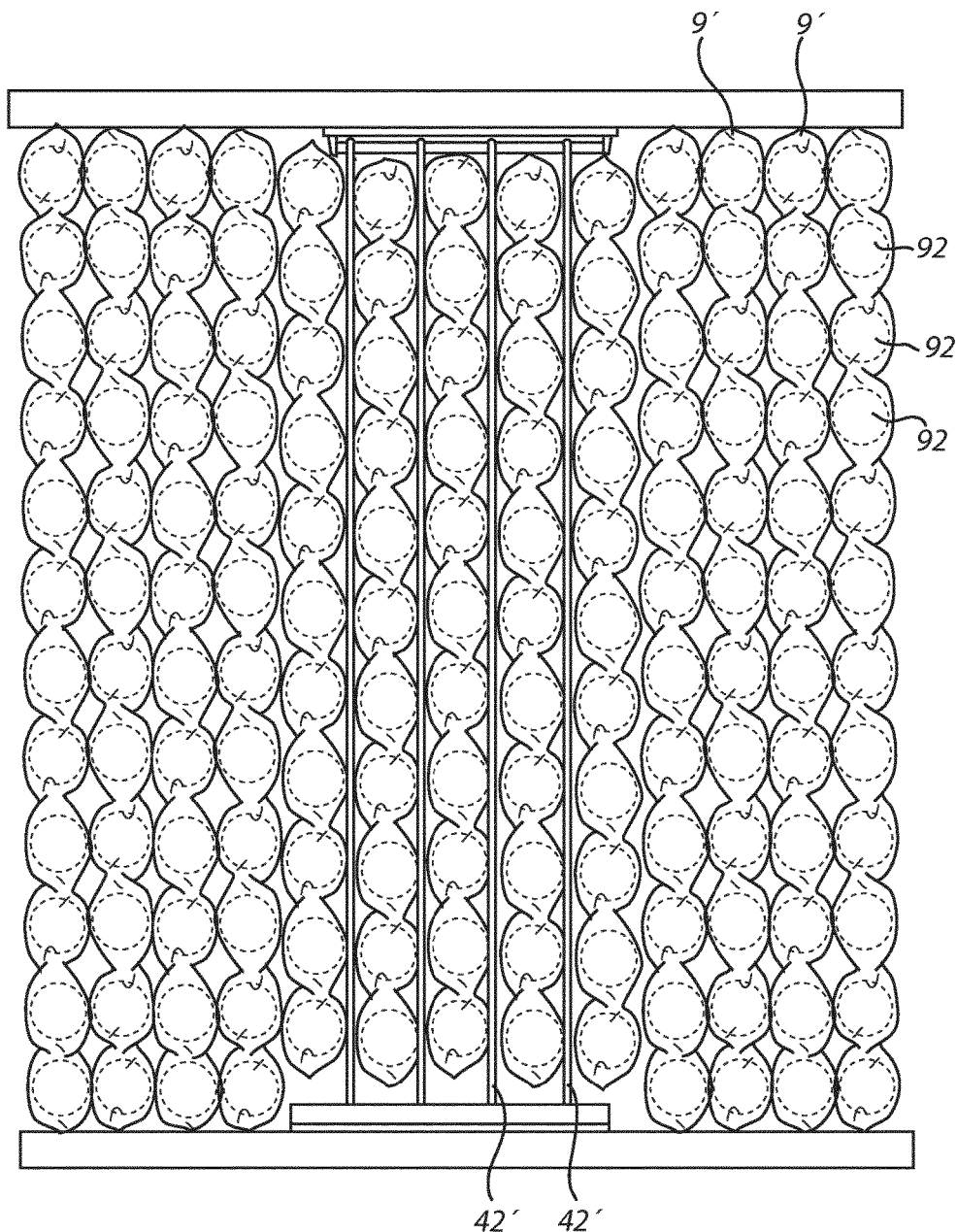
FIG. 11 shows a view from beneath of a firmness/height adjustment arrangement according to still another embodiment of the present invention.

In particular, it is of advantage to use cords when the upper mattress is a pocket spring mattress, as is schematically illustrated in FIG. 11. The cords 42' are hereby preferably arranged between the rows formed by the strings 91 of the pockets 92. The strings are connected to each other by surface attachments arranged between the sides of adjacent strings, such as adhesive or the like. By arranging the flexible elongate elements between the strings, rather than in the middle of each string, the flexible elongate elements acts on the connections between the strings rather than directly on the springs. Hereby, the resilience between the upper and lower mattresses is maintained even when the slack decreases, which increase the comfort of the bed arrangement, especially when used in a more firm setting. Further the firmness/height variations become more subtle, which improve the overall quality of the sleeping/resting experience.

The firmness adjustment means are preferably operable by a drive unit, such as a drive motor, electrically and/or pneumatically controlling the firmness of the various zones of the mattress.

In the above-discussed exemplary embodiments, the support structure is formed by a frame having dimensions corresponding to the horizontal dimensions of the upper mattress. However, the support structure may also have more limited horizontal dimensions, e.g. corresponding only to the horizontal dimension of one zone. An exemplary embodiment showing such a realization is shown in FIG. 12.

In this embodiment, the support structure forms a box, through or the like, arranged to receive the whole width of the mattress, but only a limited part of the overall length of the mattress. The mattress is not shown in FIG. 12 for improved visibility.

The support structure here comprises a self-contained frame 41', having a bottom extending underneath the mattress, and two side walls, extending on the side of the mattress, and possibly lateral support walls, e.g. in the corners, to provide increased stability and rigidity. The bottom and walls may not be solid, and may e.g. be provided by interconnected rods, bars or the like. Attached to the self-contained frame, there is a retraction device 45', here arranged at the bottom of the frame. At least one strap 42', or other type of flexible elongate element, is arranged to extend between two holding elements 43, 44' arranged at opposite sides of the self-contained frame and the variable zone(s). As in the previous embodiments, the holding element 43 may be a fixed connection, fixedly connecting the strap(s) to the frame, and the other holding element may be a displacement fixation element 44', here realized as a sliding fixation element. A further fixation element 46, here also realized as a sliding fixation element, is provided at the lower end of the frame. The retraction device 45' is here arranged as a piston, pushing the end(s) of the strap(s) 42 away to decrease the slack.

Figure 12:
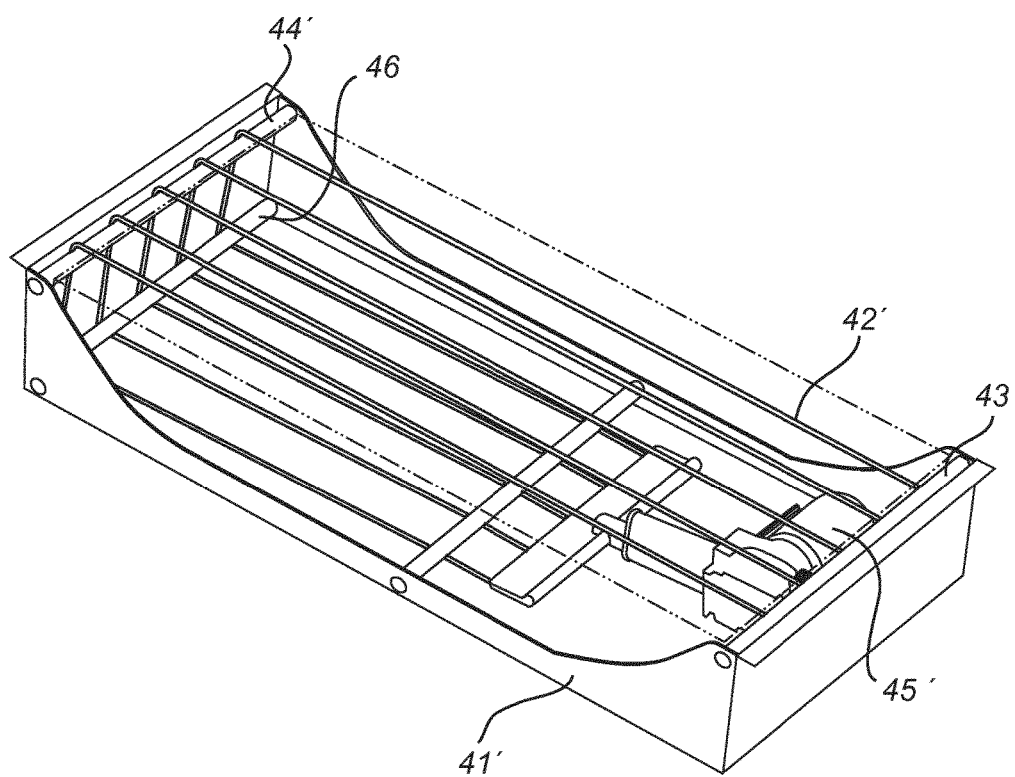
FIG. 12 shows a perspective view of a support structure having more limited horizontal dimension, corresponding to the horizontal dimensions of only a flexible zone.

In the exemplary embodiment of FIG. 12, the flexible elongate elements are illustrated as cords 42', in the same way as discussed above in relation to FIG. 11. However, other types of flexible elongate elements, e.g. as discussed in relation to the other exemplary embodiments, may be used as well in the self-contained frame.

The self-contained frame of FIG. 12 has horizontal dimensions essentially corresponding to the horizontal dimensions of one variable zone. However, several zones having independently variable properties may be provided within the self-contained frame. Further, several self-contained frames of this type may be used in one and the same mattress or bed, to form several variable zones.

The person skilled in the art realizes that the present invention by no means is limited to the preferred embodiments described above. On the contrary, many modifications and variations are possible within the scope of the appended claims. For instance, alternative mattress elements are possible to use in the zones, such as resilient elements formed by foam, rubber, coil springs, pocketed coil springs, inflatable elements, and the like. Further, the sensors may be realized in various ways, and the control unit may be set up in various ways. Also, the firmness of the mattress may be controlled manually.

The invention claimed is:

1. A mattress arrangement, comprising:
    an upper mattress;
    a lower mattress beneath said upper mattress, the lower mattress having a same width as the upper mattress; and
    a support structure beneath the upper mattress, the support structure including at least one flexible elongate element extending between two holding elements at opposite sides of at least one variable zone in said mattress arrangement,
        wherein said holding elements are between the lower mattress and the upper mattress;
    wherein the upper mattress is a pocket spring mattress including coil springs in separate pockets of a cover material, the cover material enclosing the upper mattress, and further includes a retraction device configured to control a slack of said flexible elongate element(s) by controlling a length of the flexible elongate element(s) between said holding elements, thereby controlling a height and/or firmness of the mattress arrangement in said variable zone(s); and
    wherein the retraction device is configured to retract the flexible elongate element(s) by at least one of rolling up the flexible elongate element(s) around an axle, pulling an end of the flexible elongate element(s), and pushing an end of the flexible elongate element(s).

2. The mattress arrangement of claim 1, further comprising a frame in which said lower mattress is arranged, and wherein the holding elements are connected to said frame.

3. The mattress arrangement of claim 1, wherein the lower mattress is softer, at least in a part underlying said flexible elongate element(s), than said upper mattress.

4. The mattress arrangement of claim 1, wherein one of said holding elements is a fixed holding element, fixedly and non-detachably holding one end of the flexible elongate element(s), and an oppositely arranged holding element is a displacement holding device, configured to enable holding of the flexible elongate element(s) in various displaced positions.

5. The mattress arrangement of claim 1, wherein the retraction device is beneath a plane in which the holding elements are positioned.

6. The mattress arrangement of any one of the claim 1, wherein the retraction device is essentially in a plane in which the holding elements are positioned.

7. The mattress arrangement of claim 1, wherein the retraction device is configured to retract the flexible elongate element(s) by at least one of rolling up the flexible elongate element(s) around an axle, pulling the flexible elongate element(s) and pushing the flexible elongate element(s).

8. The mattress arrangement of claim 1, wherein the retraction device is configured to be operated by at least one of an electric motor and an electric pump.

9. The mattress arrangement of claim 1, wherein the flexible elongate element(s) is/are formed of a non-elastic material.

10. The mattress arrangement of claim 1, wherein at least two parallel flexible elongate elements extend underneath each variable zone(s).

11. The mattress arrangement of claim 1, wherein the mattress arrangement includes at least two variable zones, and the support structure includes at least one flexible elongate element for each of said variable zones, the at least one flexible elongate element being configured to extend between two holding elements at opposite sides of said variable zones, and wherein the retraction device is configured to control the slack of said flexible elongate element(s) for each of said zones independently.

12. The mattress arrangement of claim 1, further comprising at least one sensor, said sensor(s) being configured to measure a physical parameter which is proportional to a weight acting on the mattress by a user or a lying position used by the user; and a control unit configured to determine, based on input from said sensor(s), a present weight/lying position of the user, and to control the retraction device to adjust the slack of the flexible elongate element(s) to preset values corresponding to the determined weight or lying position.

13. The mattress arrangement of claim 1, wherein the variable zone(s) extend(s) over essentially the whole width of the upper mattress.

14. The mattress arrangement of claim 1, wherein each variable zone is formed of a mattress part which is freely displaceable in relation to other parts of the mattress.

15. The mattress arrangement of claim 1, wherein the flexible elongate element(s) extend between adjacent rows of pocket springs.

16. The mattress arrangement of claim 1, wherein the flexible elongate element(s) is configured such that when the slack of the flexible elongate element(s) decreases and the flexible elongate element(s) is tightened, the height and/or firmness of the at least one variable zone increases, and when the slack increases and the flexible elongate element(s) is loosened, the height and/or firmness of the at least one variable zone decreases.

17. A method for adaptation of the properties of a mattress arrangement, comprising the steps of:
    providing an upper mattress, the upper mattress being a pocket spring mattress including coil springs in separate pockets of a cover material, the cover material enclosing the upper mattress;
    providing a lower mattress beneath said upper mattress, the lower mattress having a same width as the upper mattress;
    providing at least one supporting flexible elongate element underneath said upper mattress, the at least one flexible elongate element extending between two holding elements at opposite sides of at least one variable zone in said mattress arrangement,
    wherein said holding elements are between the lower mattress and the upper mattress; and
    controlling the slack of said flexible elongate element(s), thereby controlling the height and/or firmness of the mattress arrangement in at least one variable zone.

* * * * *